United States Patent
Stoyanov

(10) Patent No.: US 12,060,796 B2
(45) Date of Patent: Aug. 13, 2024

(54) SEALS AND METHODS OF MAKING SEALS

(71) Applicant: RTX CORPORATION, Farmington, CT (US)

(72) Inventor: Pantcho Stoyanov, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/562,451

(22) Filed: Dec. 27, 2021

(65) Prior Publication Data

US 2022/0120187 A1   Apr. 21, 2022

Related U.S. Application Data

(63) Continuation of application No. 15/649,099, filed on Jul. 13, 2017, now Pat. No. 11,208,907.

(51) Int. Cl.
| | | |
|---|---|---|
| F01D 11/00 | (2006.01) | |
| C23C 26/00 | (2006.01) | |
| F16J 15/08 | (2006.01) | |
| F16J 15/16 | (2006.01) | |

(52) U.S. Cl.
CPC ............ *F01D 11/003* (2013.01); *C23C 26/00* (2013.01); *F16J 15/0806* (2013.01); *F16J 15/0887* (2013.01); *F16J 15/16* (2013.01); *F05D 2220/32* (2013.01); *F05D 2230/40* (2013.01); *F05D 2300/177* (2013.01); *F05D 2300/21* (2013.01)

(58) Field of Classification Search
CPC ........ C23C 26/00; F16J 15/0887; F16J 15/16; F01D 11/00; F01D 11/003
See application file for complete search history.

(56) References Cited

U.S. PATENT DOCUMENTS

| | | | | |
|---|---|---|---|---|
| 5,795,659 A | * | 8/1998 | Meelu | F01D 5/288 428/678 |
| 6,076,835 A | * | 6/2000 | Ress | F01D 11/005 277/637 |
| 6,199,871 B1 | * | 3/2001 | Lampes | F16J 15/0887 277/614 |
| 6,918,594 B2 | * | 7/2005 | Sund | F01D 11/003 277/358 |

(Continued)

FOREIGN PATENT DOCUMENTS

WO   2006002351 A1   1/2006

OTHER PUBLICATIONS

Special Metals, Nimonic alloy 115, Sep. 2004, p. 1 (Year: 2004).*

(Continued)

*Primary Examiner* — Michael W Hotchkiss
(74) *Attorney, Agent, or Firm* — CANTOR COLBURN LLP

(57) ABSTRACT

Disclosed is a method of making a seal comprising fabricating a seal body that includes a first friction surface including nickel and cobalt. The first friction surface on the seal body is contacted with a metal counter-body surface including nickel. Pressure and heat is applied between the seal body and the counter-body, and motion is applied between the seal body and the counter-body with respect to each other in a direction parallel to the first friction surface, followed by separating the seal from the counter-body.

15 Claims, 3 Drawing Sheets

(56) References Cited

U.S. PATENT DOCUMENTS

| | | | |
|---|---|---|---|
| 7,216,871 B1* | 5/2007 | Datta | F01D 11/02 277/411 |
| 7,464,940 B2* | 12/2008 | Datta | F16J 15/0893 277/647 |
| 7,815,784 B2* | 10/2010 | Datta | F16J 15/0887 205/136 |
| 7,847,454 B2 | 12/2010 | Weeber et al. | |
| 8,016,549 B2* | 9/2011 | Shah | G10K 11/24 277/650 |
| 8,431,238 B2* | 4/2013 | Payne | F16J 15/0806 428/617 |
| 8,434,999 B2* | 5/2013 | Amaral | F16J 15/0887 415/217.1 |
| 8,545,930 B2* | 10/2013 | Stavlid | C23C 24/02 427/11 |
| 9,611,712 B2 | 4/2017 | Kalinec | |
| 9,879,780 B2* | 1/2018 | Rogers | F01D 11/005 |
| 10,087,771 B2* | 10/2018 | Mcgarrah | F04D 29/526 |
| 11,047,478 B2* | 6/2021 | Lima Sarabanda | F16J 9/26 |
| 2003/0127807 A1 | 7/2003 | More et al. | |
| 2004/0239053 A1* | 12/2004 | Rowe | F16J 15/0887 277/654 |
| 2005/0014010 A1* | 1/2005 | Dumm | C09K 3/1445 427/446 |
| 2005/0057003 A1* | 3/2005 | Iguchi | F16J 15/0887 277/591 |
| 2005/0064196 A1* | 3/2005 | Martin | C23C 28/046 428/408 |
| 2005/0118016 A1* | 6/2005 | Fokine | F01D 11/005 415/175 |
| 2005/0206097 A1* | 9/2005 | Datta | F16J 15/0893 277/644 |
| 2006/0083607 A1* | 4/2006 | Synnott | F02C 7/12 415/173.1 |
| 2006/0110246 A1* | 5/2006 | Bruce | F04D 29/563 415/160 |
| 2009/0079137 A1 | 3/2009 | Cross | |
| 2009/0208775 A1* | 8/2009 | Payne | C25D 15/00 205/261 |
| 2009/0243228 A1* | 10/2009 | Heinemann | F01D 11/005 277/595 |
| 2010/0272931 A1 | 10/2010 | Stavlid | |
| 2010/0297472 A1* | 11/2010 | Minor | C23C 14/16 428/656 |
| 2010/0310763 A1* | 12/2010 | Oboodi | C23C 18/127 427/191 |
| 2011/0312860 A1* | 12/2011 | Mathew | C23C 30/00 508/150 |
| 2012/0319362 A1* | 12/2012 | Tholen | F01D 11/005 29/888.3 |
| 2013/0156555 A1* | 6/2013 | Budinger | B23K 35/3046 420/435 |
| 2013/0177437 A1* | 7/2013 | Amancherla | C23C 4/02 416/241 R |
| 2014/0154062 A1* | 6/2014 | Weber | F01D 11/006 415/174.4 |
| 2014/0363305 A1 | 12/2014 | Shah et al. | |
| 2015/0003957 A1* | 1/2015 | Gerard | F01D 11/003 415/170.1 |
| 2016/0115811 A1* | 4/2016 | Davis | F16J 15/0887 277/591 |
| 2016/0245108 A1* | 8/2016 | Sippel | F16J 15/44 |
| 2016/0290165 A1* | 10/2016 | Crane | F01D 25/12 |
| 2016/0312894 A1* | 10/2016 | McCaffrey | C30B 33/00 |
| 2017/0030212 A1* | 2/2017 | Park | F01D 11/001 |
| 2017/0362944 A1* | 12/2017 | Gibson | C25D 7/008 |
| 2018/0087394 A1* | 3/2018 | Sarawate | F16J 15/0806 |
| 2018/0291749 A1* | 10/2018 | Sarawate | F01D 5/34 |

OTHER PUBLICATIONS

Astakhov; "Tribology of Cutting Tools"; Tribology in Manufacturing Technology; Materials Forming, Machining and Tribology; 2012; pp. 1-66.

Coskun et al.; "Friction and Wear Characteristics of Haynes 25, 188, and 214 Superalloys Against Hastelloy X up to 540 °C"; Tribol Lett.; 2012; vol. 45; pp. 497-503.

European Search Report Issued in European Patent Application No. 18182962.3 dated Jan. 7, 2019; 5 Pages.

Inman et al.; "Microscopy of Glazed Layers Formed During High Temperature Sliding Wear at 750 °C"; Wear 254; 2003; pp. 461-467.

Khajuri, "High Temperature Friction and Wear Studies of Numonic 80A and Nimonic 90 against nimonic 75 Under Dry Slinding Conditions, Jun. 26, 2017" (Year: 2017). 26 pages.

Korashy et al., "Characterization of fretting wear of cobalt-based superalloys at high temperature for aero-engine combustor components", Wear 330-331, 2015, pp. 327-337.

Lavella et al.; "Fretting Wear Characterization by Point Contact of Nickel Superalloy Interfaces"; Wear 271; 2011; pp. 1543-1551.

Reed, the Superalloys: Fundamentals and Applications, 2006, Cambridge University Press, Section 1.3 (Year: 2006). 32 pages.

Viat et al., "Nanocrystalline glaze layer in ceramic-metallic interface under fretting wear", Surface & Coatings Technology 308, 2016, pp. 307-315.

Viat et al.; "Fretting Wear of Pure Cobalt Chromium and Nickel to Identify the Distinct Roles of HS25 Alloying Elements in High Temperature Glaze Layer Formation"; Wear 376-377; 2017; pp. 1043-1054.

* cited by examiner

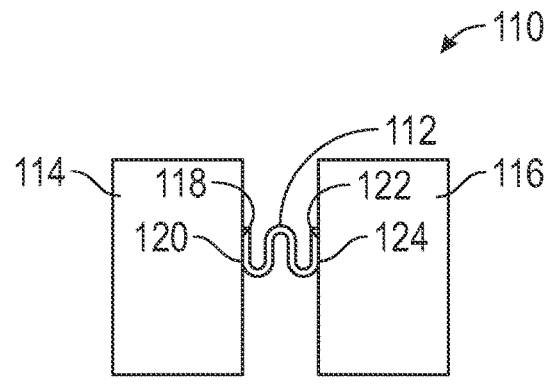
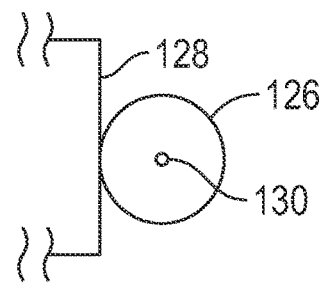
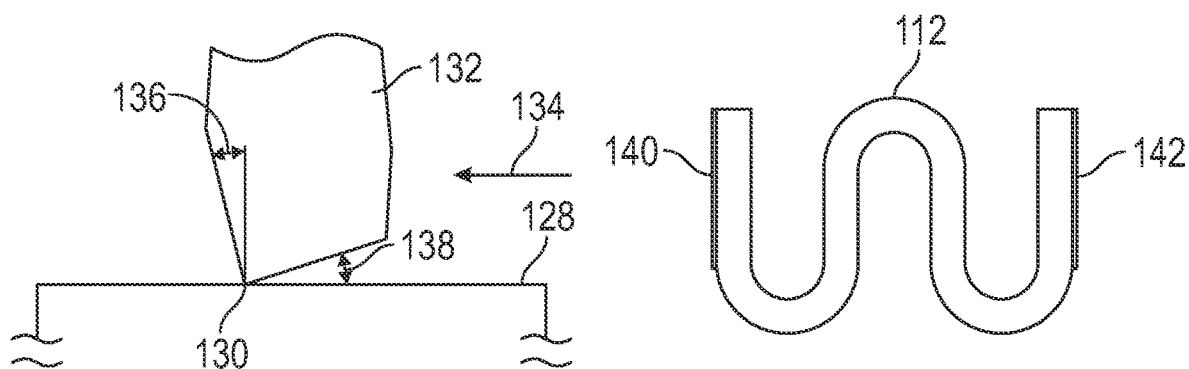
FIG. 1
FIG. 2
FIG. 3
FIG. 4

SEALS AND METHODS OF MAKING SEALS

This application is a continuation of U.S. patent application Ser. No. 15/649,099, filed on Jul. 13, 2017, which is incorporated by reference herein in its entirety.

BACKGROUND

Exemplary embodiments pertain to the art of sealing, and materials and methods for making seals.

Seals are widely used in various applications to contain fluid in desired areas of all types of equipment and devices. Seals can be fabricated from many different types of materials and according to many different types of design. Stationary seals that seal against a moving component, moving seals that travel with a moving component, and stationary seals that seal against stationary objects can be subject to wear and other undesirable effects from friction between the seal and a contact surface that moves with respect to the seal. Systems that operate in extreme environments such as the high temperatures and pressures experienced inside a turbine fan engine typically can use materials such as nickel alloys.

BRIEF DESCRIPTION

Disclosed is a method of making a seal comprising fabricating a seal body comprising a first friction surface comprising nickel and cobalt. The first friction surface on the seal body is contacted with a metal counter-body surface comprising nickel. Pressure and heat is applied between the seal body and the counter-body, and motion is applied between the seal body and the counter-body with respect to each other in a direction parallel to the first friction surface, followed by separating the seal from the counter-body.

Also disclosed is an unused seal comprising a seal body comprising an alloy that comprises nickel and cobalt, and a friction surface thereon configured to abut and seal against a sealed component, said friction surface comprising a tribofilm comprising cobalt oxide.

Also disclosed is a gas turbine engine comprising a seal that comprises an alloy comprising nickel and cobalt, the seal including a friction surface abutted and sealed against a moving sealed component, said friction surface comprising a tribofilm comprising cobalt oxide.

In some embodiments, the seal body can comprise a single crystal grain structure oriented in a direction following a cross-sectional shape of the seal body.

In some embodiments, the counter-body surface can comprise nickel and cobalt.

In some embodiments, the counter-body surface can comprise the same alloy composition as the seal body.

In some embodiments, the method further comprises contacting a second friction surface comprising nickel and cobalt on the seal body with a metal counter-body surface comprising nickel, applying pressure and heat between the seal body and the counter-body, applying motion between the seal body and the counter-body with respect to each other in a direction parallel to the second friction surface, and separating the seal from the counter-body.

In some embodiments, the method further comprises contacting the first friction surface with a first metal counter-body surface comprising nickel simultaneously with contacting the second friction surface with a second metal counter-body surface comprising nickel. Pressure and heat are applied between the first seal body friction surfaces and the first counter-body surface, simultaneously with applying pressure and heat between the second seal body friction surfaces and the second counter-body surface. Motion is applied between the first friction surface and the first counter-body surface with respect to each other in a direction parallel to the first friction surface, simultaneously with applying motion between the second friction surface and the second counter-body surface with respect to each other in a direction parallel to the second friction surface. After completion of the motion action, the seal is separated from the counter-body.

In some embodiments, the counter-body surface can comprise a flat planar surface.

In some embodiments, motion can be applied as a sliding or fretting motion between the friction surface and the counter body surface.

In some embodiments, the counter-body surface can comprise a curved planar surface.

In some embodiments, motion can be applied by rotating the counter-body along an axis of rotation having an arc coincident with the curved planar surface, and either moving the axis of rotation or the first friction surface with respect to each other or keeping the axis of rotation and the first friction surface fixed with respect to each other.

In some embodiments, the counter-body surface can comprise a machining edge disposed at a negative rake angle to the friction surface.

In some embodiments, the counter-body surface can be profiled according to a surface profile of an installed counter-body surface of a sealed component against which the first friction surface is configured to be abutted.

In some embodiments, the applied motion can produce a tribofilm comprising cobalt oxide at the friction surface.

In some embodiments, the tribofilm further comprises one or more metals or metal oxides other than cobalt.

In some embodiments, heat can be applied at a temperature of 400° F. to 1700° F. at the friction surface and pressure is applied at a pressure of 100 psi to 75 ksi.

In some embodiments, the seal can be disposed between two gas spaces in the engine at different temperatures.

In some embodiments, the seal can be configured as a seal against a vane or against a blade outer air seal, or as a piston seal.

BRIEF DESCRIPTION OF THE DRAWINGS

The following descriptions should not be considered limiting in any way. With reference to the accompanying drawings, like elements are numbered alike:

FIG. 1 is schematic depiction of cross-sectional view of an example embodiment of a seal and counter-bodies for practicing the methods described herein;

FIG. 2 is a schematic depiction of a seal surface and a roller counter-body for practicing the methods described herein;

FIG. 3 is a schematic depiction of a seal surface and a machine tool for practicing the methods described herein;

FIG. 4 is a schematic depiction of a cross-sectional view of a seal with a tribofilm layer thereon;

DETAILED DESCRIPTION

Figure 5:
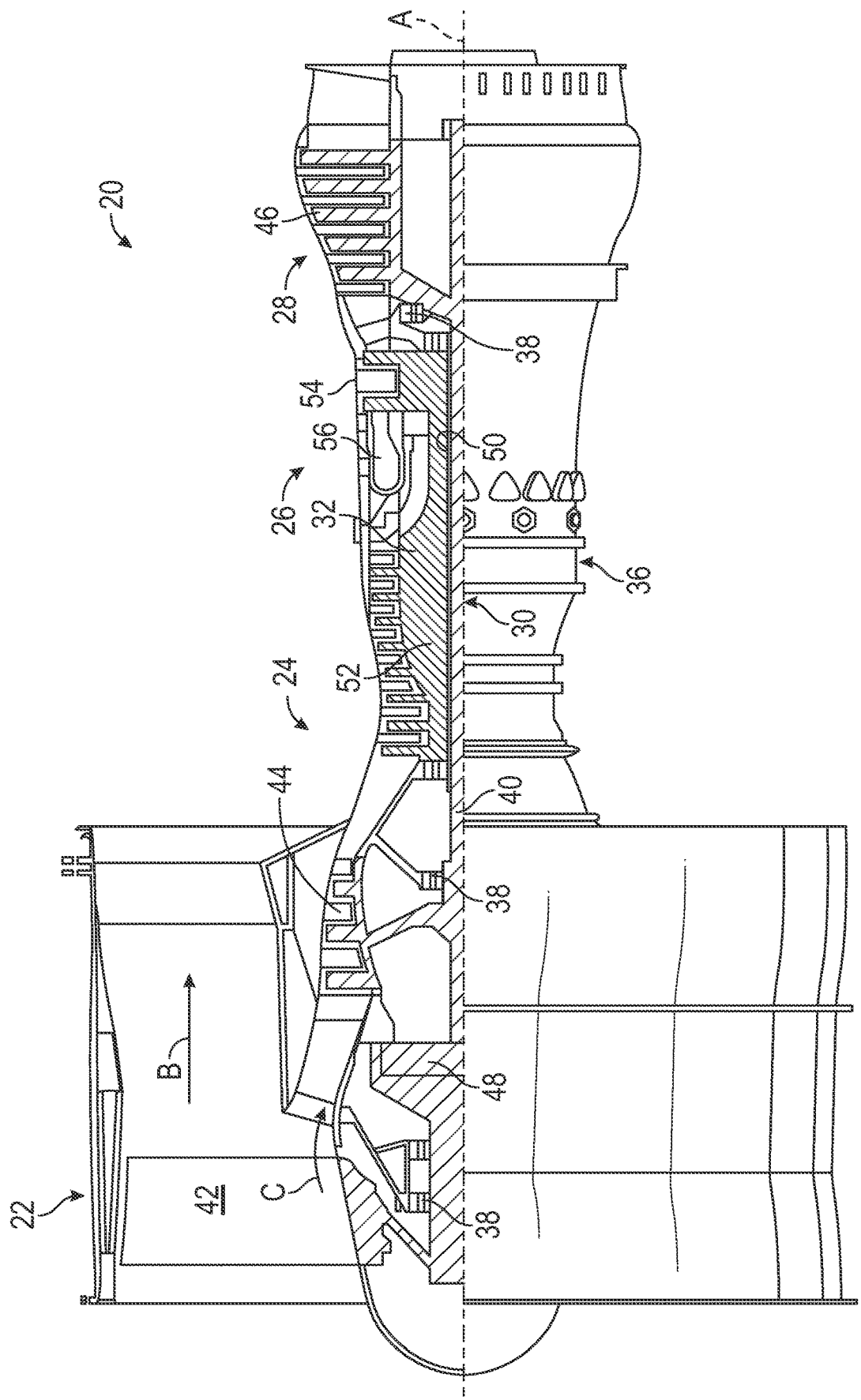
FIG. 5 is a schematic depiction of an example embodiment of a gas turbine engine.

A detailed description of one or more embodiments of the disclosed apparatus and method are presented herein by way of exemplification and not limitation with reference to the Figures.

With reference now to FIG. 1, an apparatus set-up 10 is schematically depicted in a cross-sectional view for carrying out the methods disclosed herein. As shown in FIG. 1, a metal seal body 12 is disposed between two counter-bodies 14 and 16. The seal body can be fabricated by conventional metal fabricating techniques such as casting or roll forming. In some embodiments, the seal body can be formed from a nickel alloy (defined as an alloy in which nickel is the most predominant element, and in some embodiments constitutes greater than 50 atomic % of the alloy). As mentioned above, the seal body alloy also includes cobalt. In some embodiments, the seal body alloy comprises at least 3 atomic % of cobalt. In some embodiments, the seal body alloy comprises at least 10 atomic % of cobalt. In some embodiments, the seal body alloy comprises at least 13.5 atomic % of cobalt. Other metals can also be present in the alloy, including but not limited to chromium, molybdenum, aluminum, titanium, etc. In some embodiments, the seal body can comprise a single crystal grain structure oriented in a direction following a cross-sectional shape of the seal body. Such single crystal seal structures and their fabrication are described in published US patent application US 2016/0312894A1, the disclosure of which is incorporated herein by reference in its entirety.

As mentioned above, a friction surface on the seal body is contacted with a metal counter-body surface comprising nickel. In some embodiments, the counter-body surface comprises a nickel alloy. In some embodiments, the counter-body surface further comprises cobalt, like the seal body. In some embodiments, the counter-body surface has an alloy composition that matches the composition of the seal body. Non-limiting examples of alloys for either or both of the seal body or the metal counter-body can be found in R. C. Reed, The Superalloys: Fundamentals and Applications, Cambridge University Press, 2006, the disclosure of which is incorporated herein by reference in its entirety, with two specific examples set forth in Table 1 below.

TABLE 1

|  | Cr | Co | Mo | W | Al | Ti | Ta | Re | Hf | C | B | Ni |
|---|---|---|---|---|---|---|---|---|---|---|---|---|
| Alloy 1 | 5.0 | 10.0 | 2.0 | 6.0 | 5.6 | — | 9.0 | 3.0 | 0.1 | — | — | Bal |
| Alloy 2 | 10.0 | 5.0 | — | 4.0 | 5.0 | 1.5 | 12.0 | — | — | — | — | Bal |

With reference again to FIG. 1, a first friction surface 118 on the seal body 112 is contacted with a first counter-body (e.g., a metal plate) surface 120. FIG. 1 also shows an optional second friction surface 122 on the seal body 112 contacted with a second counter-body surface 124. As further mentioned above, pressure is applied pushing friction surfaces and counter-body surfaces together. Heat is also applied to the contacted surfaces. In some embodiments, applied pressure can be in a range having a lower end of 100 psi, 530 psi, or 851 psi, and an upper end of 7 ksi (kilopounds per square inch), 53 ksi, or 75 ksi. These upper and lower endpoints can be independently combined to yield a number of different ranges, and ranges representing each possible combination of endpoints are hereby explicitly disclosed. In some embodiments, heat can be applied to the contact surface interface at a temperature in a range the contacted surfaces. In some embodiments, heat can be applied at a temperature in a range having a lower end of 300° F., 400° F., or 450° F., and an upper end of 1250° F., 1700° F., or 1750° F. These upper and lower endpoints can be independently combined to yield a number of different ranges, and ranges representing each possible combination of endpoints are hereby explicitly disclosed. Do we want to include actual composition as example. Table 1 Example of alloy compositions for this invention.

As further mentioned above, motion is applied between the seal body 112 and the counter-bodies 114 and 116. Various techniques can be used to impart the relative motion between the seal body friction surface(s) and counter-body surface(s). In the example embodiment of FIG. 1 with counter-bodies with flat planar contact surfaces, a sliding or fretting motion can be imparted by moving either the seal body 112 while holding the counter-bodies 114 and 116 stationary, by moving the counter-bodies 114 and 116 while holding the seal body stationary, or by moving all three components. The direction of the relative motion can be a back and forth sliding motion in a direction parallel to the friction surface or in multiple directions parallel to the friction surface (e.g., in the frame of reference of FIG. 1, an up and down sliding motion, a sliding motion directly into and out from the page of the depicted 2-dimensional figure, or in multiple directions in between, e.g., an 8-way back and forth sliding motion. In some embodiments, the amplitude of the back and forth motion can be in a range having a lower end of 0.0001 inches, 0.0005 inches, or 0.005 inches, and an upper end of 0.017 inches, 0.043 inches, or 0.5 inches, not including translation movement. These upper and lower endpoints can be independently combined to yield a number of different ranges, and ranges representing each possible combination of endpoints are hereby explicitly disclosed. In some embodiments, the frequency of the back and forth motion can be in a range having a lower end of 0.25 Hz, 30 Hz, or 60 Hz, and an upper end of 300 Hz, 1 kHz, or 5 kHz. These upper and lower endpoints can be independently combined to yield a number of different ranges, and ranges representing each possible combination of endpoints are hereby explicitly disclosed. It should be noted that although FIG. 1 depicts a set-up for simultaneous contact and motion between two friction surfaces 118, 122 and two counter-body surfaces 120, 124, the surface treatment can be performed sequentially as well, either using different counter-bodies for the different seal friction surfaces or using the same counter-body for multiple seal friction surfaces.

Other techniques can also be used to impart relative motion between a seal body friction surface and a counter-body surface, including but not limited to ball or roller burnishing or negative rake angle machining. An example embodiment of a set-up for ball or roller burnishing is shown in a cross-sectional view FIG. 2. As shown in FIG. 2, a ball-shaped or roller-shaped counter-body 126 is contacted with a seal friction surface 128, and heat and pressure is applied as described above. Motion is applied by rotating the counter-body 126 about axis 130. The counter-body 126 can be maintained in a fixed position to treat a small area of the seal friction surface 128 or the counter-body 126 can be moved so that the axis of rotation 130 also moves with respect to the seal friction surface 128. The motion of the axis of rotation 130 can be slower than a rolling rate across the seal friction surface 128 from rotation of the counter-body 126, or it can be equal to or faster than the rolling rate from rotation of the counter-body 126. An example embodiment of a set-up for negative rake angle machining is schematically shown in FIG. 3. As shown in FIG. 3, a cutting point 130 of a cutting tool 132 is moved across the seal friction surface 128 in the direction of arrow 134. A negative rake ankle 136 combined with the relief angle 138 allows the cutting edge 130 to drag across seal friction surface 128 (as opposed to cutting into the surface) to provide a burnishing effect. Other shapes of counter-bodies can also be used. For example, in some embodiments, the shape or contour of the counter-body can be patterned after (e.g., can match) a shape or contour of a sealed component against which the seal friction surface is configured to be abutted during installation/operation. An example of this embodiment is shown in FIG. 1 for a flat planar sealed component surface.

In some embodiments, the application of motion between the seal friction surface(s) and counter-body surface(s) under heat and pressure can provide a technical effect of promoting formation of a cobalt-based oxide layer (e.g, a tribofilm) at the friction surface(s) of the seal body. One or more constituents other than cobalt such as metals or metal oxides can also be present in the Co-based oxide layer (tribofilm). Examples of such other metals or metal oxides include but are not limited to Cr, Re, Ta, Ti, Ni, Mo, W, Al, and oxides thereof. In FIG. 4, the example embodiment seal body 112 of FIG. 1 is schematically shown in a cross-sectional view with cobalt-based oxide layers 140 and 142 resulting from the surface treatment from counter-bodies 114 and 116, respectively. In some embodiments, the cobalt oxide layer can have a thickness in a range having a lower end of 100 nm, 350 nm, or 600 nm, and an upper end of 1.5 µm, 3.0 µm, or 20 µm. These upper and lower endpoints can be independently combined to yield a number of different ranges, and ranges representing each possible combination of endpoints are hereby explicitly disclosed. In some embodiments, the cobalt oxide layer can provide a technical effect of promoting lubricity of the seal friction surface when it is placed in contact during installation/operation with a sealed component. Unlike alumina or other oxides found in tribofilms that form during operation of the seal, the controlled conditions described herein allow the formation of more lubricious cobalt oxides. Additionally, the methods described herein allow for a new seal to be installed with a lubricious tribofilm already in place, thus avoiding undesirable break-in wear on both the seal surface and the more expensive counterface.

In some embodiments, the nickel-based seals described herein can be installed in environments with extreme conditions such as those found in gas turbine engines. FIG. 5 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition--typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 m/sec).

Figure 6:
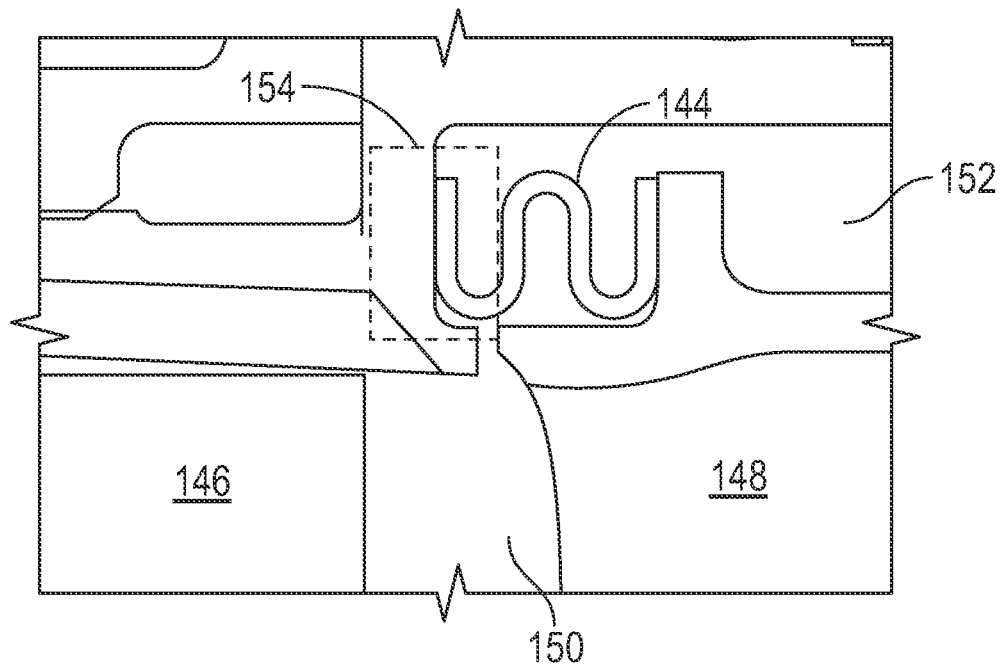
FIG. 6 is a schematic depiction of an example embodiment of a W-seal installed in a gas turbine engine.
Figure 7:
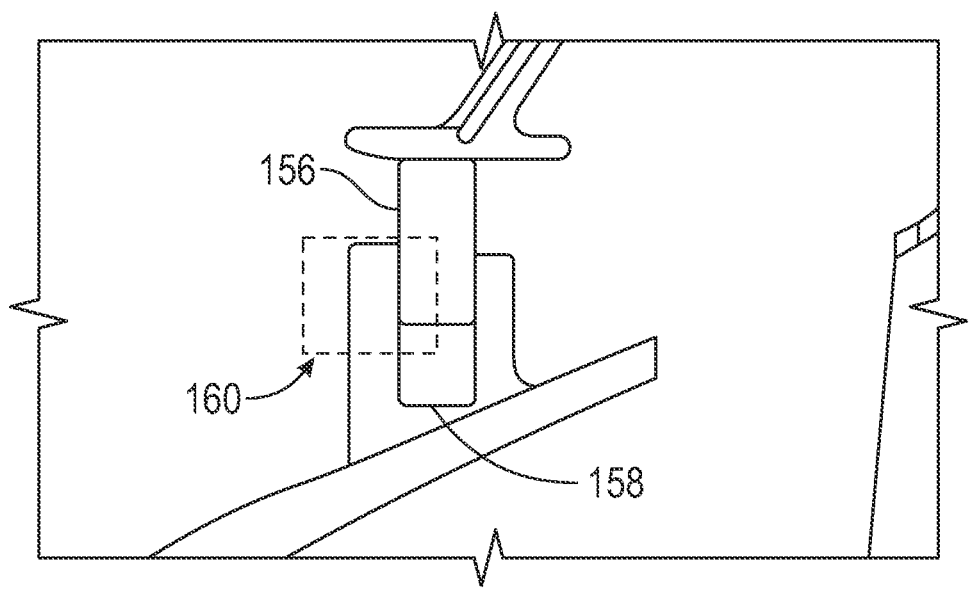
FIG. 7 is a schematic depiction of an example embodiment of a piston seal installed in a gas turbine engine.

Magnified views of typical seal installations in a gas turbine engine are schematically shown in FIGS. 6 and 7. FIG. 6 shows a W-seal 144 at the 8$^{th}$ outer air seal (HPC) disposed between compressor vane 146 and exit guide vane 148. The seal 144 is shown disposed between a hot fluid area 150 and a cold fluid area 152. Wear typically occurs in a wear area 154 that includes the seal friction surface. FIG. 7 shows a piston seal 156 disposed in a mid-turbine frame vane aft outside diameter seal groove 158. In this example embodiment, wear typically occurs in a wear area 160 that includes the seal friction surface. Other configurations of seals and placements of seals can be used as well, including but not limited to O,C, and E-type cross-sections, U-Plex seals, or M-seals.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A seal comprising: a seal body comprising an alloy that comprises nickel and cobalt, and a friction surface thereon in contact with a metal counter-body surface, the friction surface having a tribofilm comprising cobalt oxide and at least one of rhenium, tantalum, or oxides thereof at the friction surface, the friction surface configured to abut and seal against a sealed component; wherein the tribofilm has a thickness in a range having a lower end of 100 nm and an upper end of 3.0 pm;
and wherein the alloy comprises greater than 50 atomic % of nickel, and wherein the alloy comprises at least 3 atomic % of cobalt, and wherein the alloy comprises at least 5 atomic % of aluminum; wherein the counter-body surface comprises the same alloy composition as the seal body wherein the counter-body surface is configured to be moved against the friction surface alongside an application of heat and pressure to produce the tribofilm.

2. The seal of claim 1, wherein the tribofilm further comprises at least one of titanium or molybdenum or oxides thereof.

3. The seal of claim 1, wherein the seal body comprises a single crystal grain structure oriented in a direction following a cross-sectional shape of the seal body.

4. The seal of claim 1, wherein the tribofilm has a thickness in a range having a lower end of 600 nm and an upper end of 1.5 µm.

5. The seal of claim 1, wherein the tribofilm promotes lubricity of the friction surface when the friction surface is placed in contact with the sealed component.

6. The seal of claim 1, wherein the seal body is configured to be disposed between two gas spaces in a gas turbine engine at different temperatures.

7. The seal of claim 1, wherein the seal body is configured as a seal against a vane or against a blade outer air seal, or as a piston seal.

8. The seal of claim 1, wherein the alloy comprises greater than 50 atomic % of nickel, wherein the alloy comprises at least 10 atomic % of cobalt.

9. The seal of claim 1, wherein the alloy comprises greater than 50 atomic % of nickel, wherein the alloy comprises at least 13.5 atomic % of cobalt.

10. The seal of claim 1, wherein the alloy comprises greater than 50 atomic % of nickel, and wherein the alloy comprises at least 10 atomic % of cobalt, and wherein the alloy comprises at least 5 atomic % of aluminum.

11. The seal of claim 1, wherein the alloy comprises greater than 50 atomic % of nickel, and wherein the alloy comprises at least 13.5 atomic % of cobalt, and wherein the alloy comprises at least 5 atomic % of aluminum.

12. A gas turbine engine comprising: a seal that comprises an alloy comprising nickel and cobalt, the seal including a friction surface in contact with a metal counter-body surface, the friction surface having a tribofilm comprising cobalt oxide and at least one of rhenium, tantalum, or oxides thereof at the friction surface, the friction surface configured to abut and seal against a moving sealed component;
wherein the tribofilm has a thickness in a range having a lower end of 100 nm and an upper end of 3.0 pm; and wherein the alloy comprises greater than 50 atomic % of nickel, and wherein the alloy comprises at least 3 atomic % of cobalt, and wherein the alloy comprises at least 5 atomic % of aluminum; wherein the counter-body surface comprises the same alloy composition as the seal wherein the counter-body surface is configured to be moved against the friction surface alongside an application of heat and pressure to produce the tribofilm.

13. The gas turbine engine of claim 12, wherein the seal is configured to be disposed between two gas spaces in the engine at different temperatures.

14. The gas turbine engine of claim 12, wherein the seal is configured as a seal against a vane or against a blade outer air seal, or as a piston seal.

15. The gas turbine engine of claim 12, wherein the seal comprises a single crystal grain structure oriented in a direction following a cross-sectional shape of the seal.

\* \* \* \* \*